Figure 1:
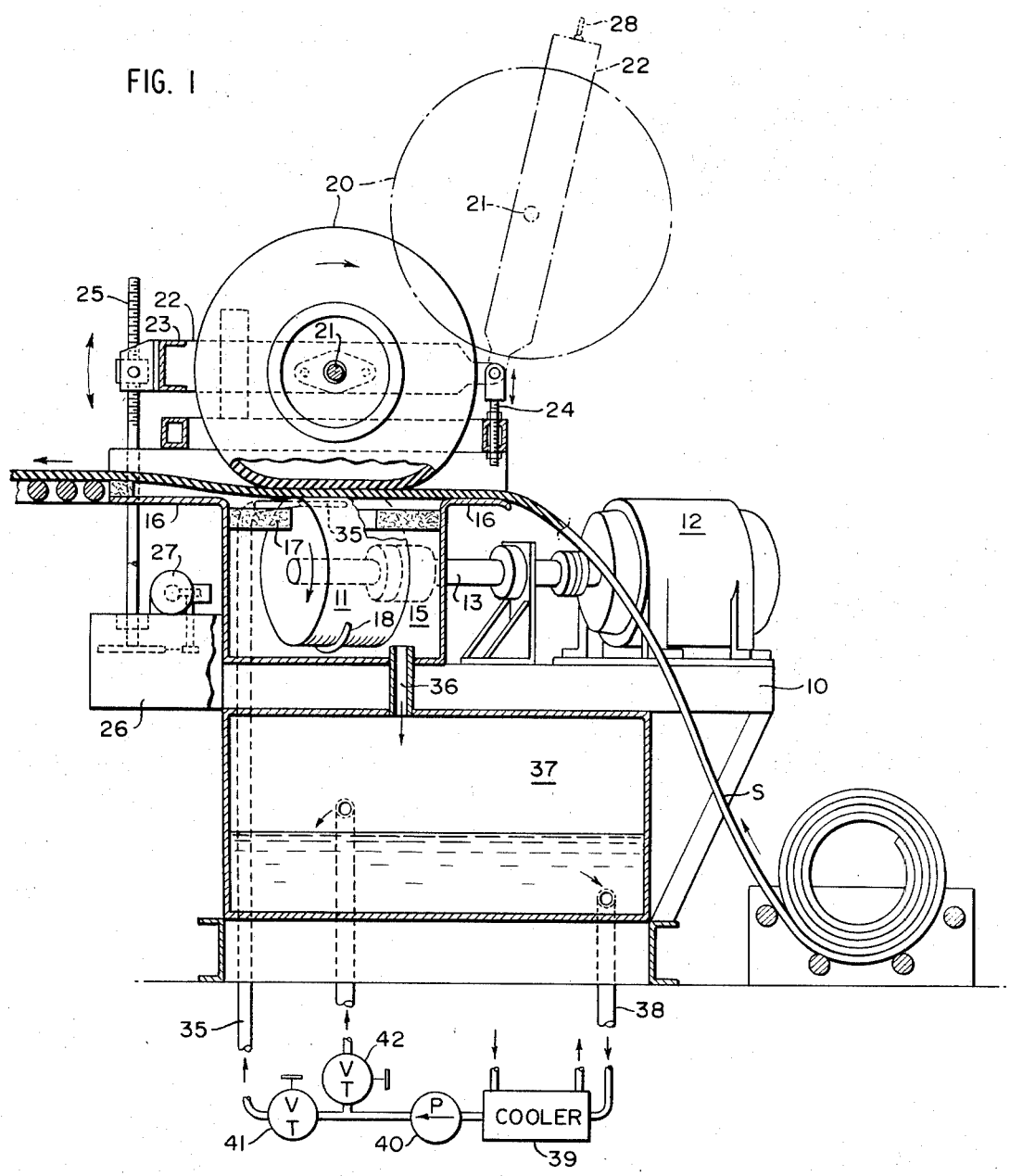

United States Patent
Meserve

[15] 3,683,728
[45] Aug. 15, 1972

[54] MACHINE FOR MICRO SIPED TREAD STOCK

[72] Inventor: Forrest Clayton Meserve, North Andover, Mass.

[73] Assignee: Bandage Incorporated, Muscatine, Iowa

[22] Filed: Jan. 28, 1971

[21] Appl. No.: 110,539

[52] U.S. Cl. .......................... 83/12, 83/171, 83/347, 83/672, 157/13
[51] Int. Cl. ............................................. B29b 21/08
[58] Field of Search ........ 83/1, 6, 9, 12, 171; 157/13; 83/342, 347, 672

[56] References Cited

UNITED STATES PATENTS

| | | | |
|---|---|---|---|
| 2,019,499 | 11/1935 | Maher | 83/12 |
| 3,570,337 | 3/1971 | Morgan | 83/12 |

FOREIGN PATENTS OR APPLICATIONS

| | | | |
|---|---|---|---|
| 675,850 | 5/1939 | Germany | 83/171 |

Primary Examiner—Willie G. Abercrombie
Attorney—Kenway, Jenney & Hildreth

[57] ABSTRACT

A machine for making siping slashes in a continuous strip or ribbon of sheet material of indefinite length, such as pre-cured natural or synthetic tire stock, and in which is incorporated a new and improved lubricating system adapting the machine to operate upon hard, tough elastomeric stock which otherwise has a tendency to cling to the knife and overheat it.

10 Claims, 5 Drawing Figures

PATENTED AUG 15 1972

3,683,728

SHEET 1 OF 2

MACHINE FOR MICRO SIPED TREAD STOCK

The invention is embodied in a machine employing a threaded drum and presser roll for feeding a work strip to a rotary helical knife. The problem of siping tire tread stock has proved difficult of solution for the reason that this hard and tough stock has a tendency to stick and cling to the siping knife and so objectionably overheat it at the siping point. We have found that a rotary knife speed of about 1,650 rpm is desirable from the standpoint of economy of manufacture and quality of product. It is therefore feasible to employ in the machine of this invention a standard commercial 1,700 rpm motor in order to supply the desired high speed rotation. The tire tread stock may in this way be siped at the rate of 40 feet per minute if adequate lubrication is employed. However, it has been found that liquid lubricant sprayed or otherwise applied to the rotating drum and knife is thrown off centrifugally before the lubricant reaches the point of siping the stock. In order to avoid this objection and supply adequate lubricant under high speed operating conditions it is now proposed to create and maintain a standing pool of liquid lubricant in which both the drum and the knife are partially submerged in approaching the tire stock or other work piece to be siped.

The machine herein shown is also provided with novel means for adjusting and regulating the angular position of the presser roll in respect to the threaded knife-carrying drum. This provides the machine with convenient means for varying the traction angle of the siping cuts and their depth in the siped stock as well as other advantages which will be noted, such as toggle locks for quick release of the presser roll for bodily movement to an inoperative position and for governing its angular position as above noted.

Figure 2:
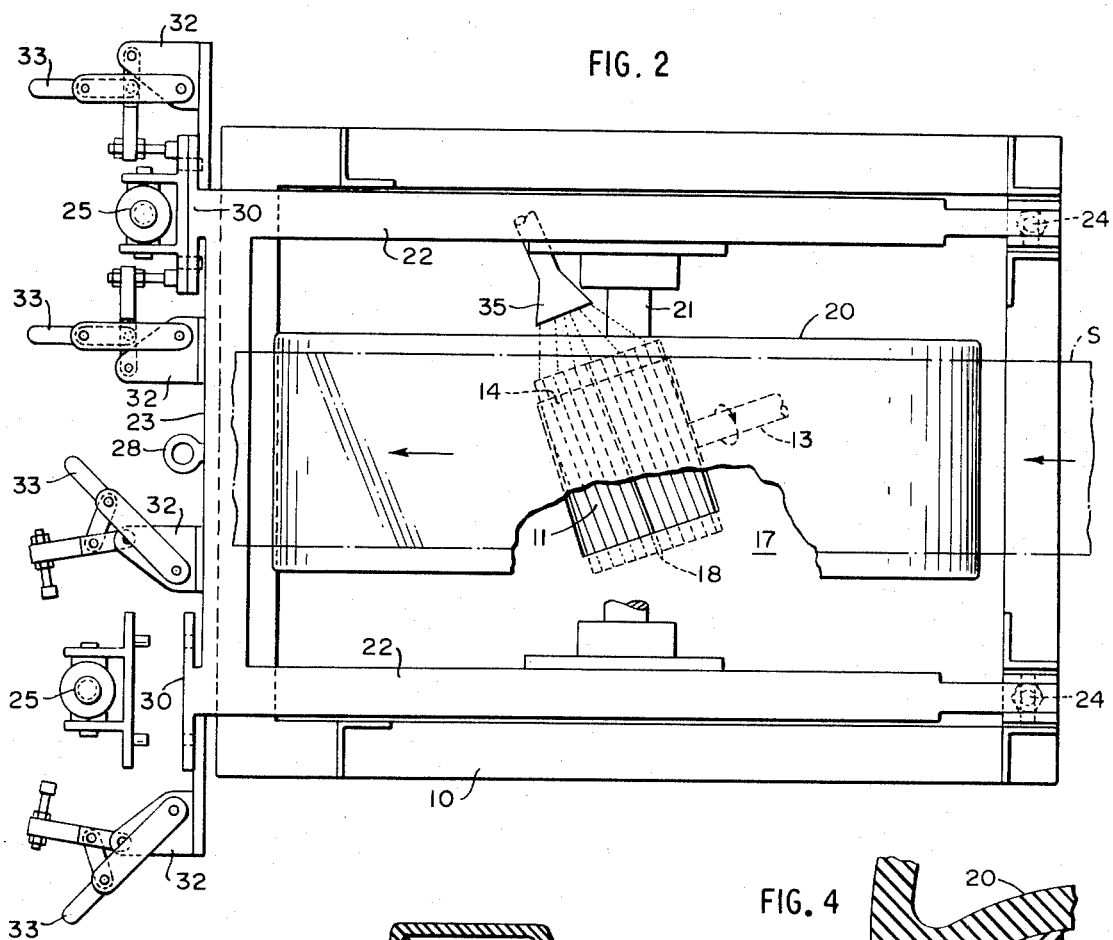
Figures 3, 4:
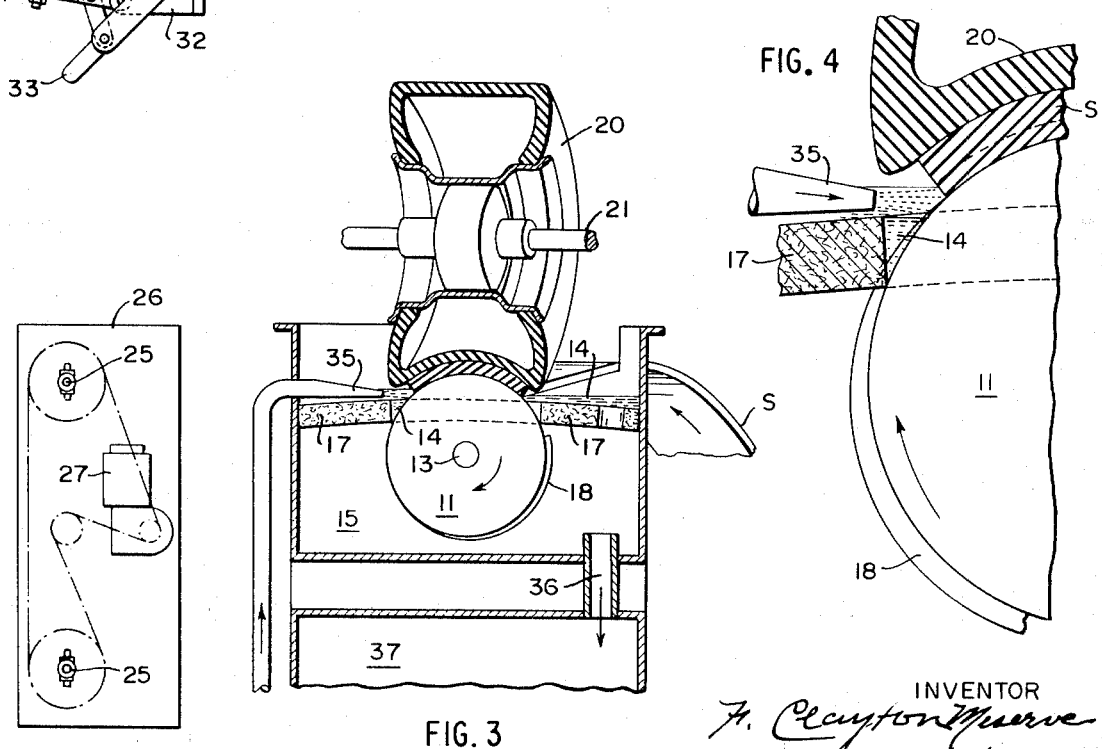
Figure 5:
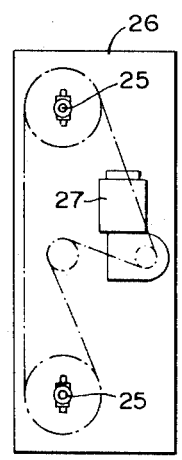

These and other features of the invention will be best understood and appreciated from the following description of a preferred embodiment thereof, selected for purposes of illustration and shown in the accompanying drawings, in which FIG. 1 is a view of the machine in elevation with some parts shown in section, FIG. 2 is a corresponding plan view showing a part of the presser roll broken away, FIG. 3 is a fragmentary sectional view of the siping tank, FIGS. 4 and 5 are fragmentary views supplementing the showing of FIG. 3.

The illustrated machine is designed to operate with a lubricant such as a water solution of triethylolamine but of course is not limited in that respect.

The frame of the machine as herein shown is constructed of angle iron and sheet metal. It includes a table 10 beneath a portion of which is mounted a threaded drum 11 and its direct connected motor 12 through a horizontal shaft 13. The drum 11 is provided with a helical thread which indents and feeds the work and also carries a helical knife or blade 18. This makes one siping cut in each revolution of the drum. An overhead tank or reservoir 15 is mounted in one side of the frame in order that the tire stock S, preferably in chilled condition, may be conveniently fed to the machine. The tire stock is directed upwardly over an apron 16 which forms the upper edge of the overhead tank. This tank 15 is partially closed by a rectangular cover partition 17 having a rectangular aperture shaped to receive the upper sector of the threaded drum 11. This aperture is shaped to fit the drum 11, resting at both ends thereon and forming with the surface of the drum and the ends thereof, a standing pool 14 of liquid lubricant. In FIG. 1 a portion of the threaded drum 11 is shown as broken away to expose a sectional part of the partition.

The motor 12 with its direct-connected drum 11 constitute a unitary assembly that may be adjustably set in the frame at any desired angle to the line of feed in order to determine the traction angle of the siped cuts.

In siping tire stock for trucks the stock can be handled at the rate of 45 feet per minute with spacing of three cuts to an inch, while for passenger tires a spacing of seven cuts to the inch may be employed to advantage.

The threaded drum 11 carries a helical knife 18 of the same pitch as the threads and projecting beyond their outer diameter by the depth of the desired siping cut. A presser roll 20 cooperates with the threaded drum 11 in feeding the work and also in conforming the tire stock S to the contour of the drum as shown in FIG. 5. The presser roll 20 is rotatably mounted upon a shaft 21 extending transversely between the arms 22 which are pivotally connected to the frame at their rear ends by adjustable bolts 23. These bolts are useful in adjusting the arms 22 and the pressure of the roll 20.

The arms 22 are connected at their outer ends by a transverse strut 23 and form with it a rectangular frame hinged at its inner end to the main frame of the machine.

Each of the arms 22 has at its outer end a swivel nut 24 threaded upon a long vertical screw 25 which projects upwardly from a box-like portion 26 of the frame and contains a motor 27 and chain drive both geared to upright screws 25. It will be apparent that this motor may be employed to raise or lower the presser roll 20. The transverse strut of the pivoted frame is provided centrally with an eye 28 by which the pivoted secondary frame may be engaged and swung upwardly to bring the presser roll into an elevated inoperative position as shown in FIG. 1. It is important to space apart the vertical adjusting screws 25 so that the siped stock may be drawn forwardly between them without interference in the normal operation of the machine.

Each of the side arms 22 terminates at its front end in a down-turned friction pad or plate 30 arranged just to clear the back of the machine frame in the initial position of the parts. Opposite each pad 30 is provided a toggle link 31 pivotally mounted on a fixed toggle abutment 32. A toggle handle link 33 is also pivoted to this abutment. When this toggle is broken, as shown at the left side of FIG. 2, the corresponding side arm is free to move up or down to different adjusted positions, thus regulating the action of the presser roll. On the other hand, by straightening the toggle the hinged frame may be instantaneously locked in any selected position of adjustment.

The wall of the overhead tank 15 confines a standing pool 14 of lubricant formed by the cover partition 17 and the sector of the threaded drum 11 which projects through its aperture. The knife 18 passes upwardly in arriving at the siping point which is at the bite of the drum 11 and the presser roll 20. The result is that the knife 18 is copiously lubricated at the very point of heat generation.

The depth of siping cuts may be varied by radial outward adjustment of the knife 18 about its inner end. This is herein shown as perforated to receive a stud fixed in one of the drum sections. The transverse width of the siping cuts may be increased by increasing the pressure of the presser roll 20 upon the work piece beneath it.

Supplementing the lubricating step as above described, a spray nozzle 35 is directed toward the bite of the drum and roll as suggested in FIG. 3 for the purpose of introducing fresh lubricant into the system at a critical point in the stream.

The apron 16 may be utilized as an automatic stop for stopping the machine in case it tends to run out of raw stock. A float or depth gauge 36 is located within the tank 15. This gauge operates to maintain the desired working level of lubricant in the tank. A water emulsion of triethanolamide has proved to be the best lubricant known to me for use with the disclosed machine.

The knife blade herein shown with the drum assembly constitutes the subject matter of my copending application Ser. No. 853,768 filed Aug. 28, 1969 to which reference may be had for further details of mechanical construction.

The shaft 13 makes a taper fit with the hub of the drum 11 thus providing for interchangeable employment of drums in the machine of different thread pitch or contour.

The tank 15 has a circulating passage 36 in its bottom wall and this is arranged to discharge directly into a large reservoir 37 enclosed in the main frame of the machine. The reservoir 37 is also provided near its bottom with an outlet pipe 38 which is part of a fluid circulating system including valves 41 and 42 by which the rate of flow may be regulated through by-pass connections subject to the continuous action of a cooler disposed in the lower part of the reservoir 37.

The operation of the illustrative machine is carried out as follows. One end of the strip of tire stock S is first inserted by hand in the bite of the drum 11 and roll 20. At this point the knife 18 is fully immersed in the pool of lubricant as is also an upper sector of the drum 11. When the machine is started the strip of tire stock is advanced by worm and thread action of the drum 11 while lubricant is picked up by the drum and knife. The knife 18 makes one siping cut for each revolution of the drum, for example, four to seven siping cuts per inch of the tire stock. It will be understood that the preliminary adjustments may be made rapidly and conveniently before the machine is set in operation and with the assistance of the motor 26 as fixed by the toggles 33.

It will be apparent that with these safeguard features the machine may be set up and operated on an automatic basis.

Having thus disclosed my invention and described an illustrative embodiment thereof, I claim as new and desire to secure by Letters Patent:

1. A siping machine including in its structure a threaded rotary drum carrying a helical knife and a rotary presser roll cooperating with the drum in feeding the work, a substantially horizontal partition having an elongated aperture through which the drum projects and with which the drum and partition form means for directing a sufficient flow of liquid lubricant to submerge the knife on rotary movement with the drum.

2. A siping machine as described in claim 1, wherein the apertured partition sets off an upwardly projecting sector of the threaded drum which is immersed in a standing pool of lubricant supported by the partition.

3. A siping machine as described in claim 1, wherein the aperture in the partition corresponds in contour with the drum and is disposed at a substantial angle to the axis of the presser roll so as to expose the threads of the drum to contact with the presser roll.

4. A siping machine as described in claim 1, wherein the aperture in the partition is rectangular in shape and the partition rests on the drum at both ends of the aperture.

5. A siping machine as described in claim 1, wherein the presser roll is supported at each side by an arm pivotally mounted on the frame, movable with the roll to an inoperative position, and having an independent toggle lock for engaging and disengaging the presser arm and presser roll.

6. A siping machine as described in claim 1, wherein the presser roll is rotatably mounted between a pair of spaced pivoted arms connected to a vertical supporting screw and operating motor connections for lifting or lowering said arms.

7. A siping machine as described in claim 1, wherein a lubricant reservoir is enclosed in the lower part of the machine frame and means providing a standing pool of liquid lubricant in the upper part of the frame surrounding the threaded drum, and fluid connections between the reservoir and said standing pool which include a cooler, pump and relief valve.

8. A siping machine as described in claim 1, wherein the frame includes a horizontal table portion to which the threaded drum and motor as an assembly may be detachably attached in selected positions of horizontal angular adjustment.

9. A siping machine as described in claim 1, wherein the threaded drum carries a tank apertured to fit upon the drum and movably supported on the table portion of the frame to maintain a close fitting relation with the drum in all positions thereof.

10. A siping machine as described in claim 1, wherein the presser roll is mounted to rotate between spaced arms pivoted at one end to the machine frame and having a toggle-operated plate at the other arranged to clamp the arms with the presser roll in any selected position of pressure on the work beneath it.

* * * * *